(12) United States Patent
Graebner et al.

(10) Patent No.: US 11,499,105 B2
(45) Date of Patent: Nov. 15, 2022

(54) METHOD OF ONLINE CONTROL OF A SLAG FORMING GASIFICATION PROCESS AND PLANT FOR A GASIFICATION PROCESS

(71) Applicant: L'Air Liquide, Societe Anonyme pour l'Etude et l'Exploitation des Procedes Georges Claude, Paris (FR)

(72) Inventors: Martin Graebner, Aizenau (DE); Adrianna Baran, Dresden (DE); Evrim Oers, Frankfurt (DE); Hans-Peter Moench, Frankfurt (DE)

(73) Assignee: L'Air Liquide, Societe Anonyme Pour L'Etude Et L'Exploitation Des Procedes Georges Claude, Paris (FR)

( * ) Notice: Subject to any disclaimer, the term of this patent is extended or adjusted under 35 U.S.C. 154(b) by 396 days.

(21) Appl. No.: 16/845,449

(22) Filed: Apr. 10, 2020

(65) Prior Publication Data
US 2020/0325408 A1    Oct. 15, 2020

(30) Foreign Application Priority Data
Apr. 15, 2019   (EP) .................................... 19020288

(51) Int. Cl.
*C10J 3/24*    (2006.01)
*C10J 3/34*    (2006.01)
(Continued)

(52) U.S. Cl.
CPC . *C10J 3/24* (2013.01); *C10J 3/34* (2013.01); *F23J 1/06* (2013.01); *G06N 3/08* (2013.01);
(Continued)

(58) Field of Classification Search
CPC ..... G01N 2223/617; G01N 2001/1018; G01N 33/222; G01N 33/2835; C10J 2300/18; C10J 3/723
See application file for complete search history.

(56) References Cited

U.S. PATENT DOCUMENTS 4,615,713 A * 10/1986 Meyer ........................ C10J 3/76
48/68
4,664,678 A * 5/1987 Rehmat ..................... C10J 3/523
110/165 R
(Continued)

FOREIGN PATENT DOCUMENTS

| EP | 0 510 341 | 10/1992 |
|---|---|---|
| GB | 2 116 698 | 9/1983 |
| WO | WO 2012/055753 | 5/2012 |

OTHER PUBLICATIONS

EP Search Report and Written Opinion for EP 19020288, dated Aug. 26, 2019. (Machine Translation.).

*Primary Examiner* — Imran Akram
(74) *Attorney, Agent, or Firm* — Justin K. Murray

(57) ABSTRACT

A method of online control of a slag-forming process of gasification of a carbonaceous solid fuel, especially coal, in a gasification reactor with supply of a gasifying agent and a moderator is provided. Certain embodiments relate to a gasification process for producing a product gas including carbon monoxide and hydrogen from a solid fuel, to a computer program for online control of the slag-forming gasification process, and to a plant for conducting a gasification process for producing a product gas including carbon monoxide and hydrogen from a solid fuel. Certain aspects of the invention combine an online solid fuel analysis with a process model in order to operate a gasification process for solid fuels by the feed-forward principle at the thermodynamically optimal operating point. The invention permits (Continued)

the establishment of the operating point in real time in order to react to rapid variations in the composition of the solid fuel. Certain embodiments also permit the complete automation of the gasification process.

18 Claims, 1 Drawing Sheet

(51) Int. Cl.
    *F23J 1/06*         (2006.01)
    *G06N 3/08*        (2006.01)

(52) U.S. Cl.
    CPC .... *C10J 2300/1612* (2013.01); *C10J 2300/18* (2013.01)

(56) References Cited

U.S. PATENT DOCUMENTS

| | | | |
|---|---|---|---|
| 4,916,719 A | | 4/1990 | Kawatra et al. |
| 4,959,549 A | * | 9/1990 | Haub .................... G01N 33/222 |
| | | | 250/359.1 |
| 5,094,669 A | * | 3/1992 | Herbert ...................... C10J 3/06 |
| | | | 48/66 |
| 2009/0255182 A1 | * | 10/2009 | Gaur .......................... C10J 3/66 |
| | | | 48/197 R |
| 2013/0298464 A1 | | 11/2013 | Fleischer et al. |
| 2018/0230390 A1 | * | 8/2018 | Kwong ...................... C10J 3/84 |
| 2019/0072331 A1 | | 3/2019 | Yamamoto et al. |
| 2020/0017783 A1 | * | 1/2020 | Santos Graca ........ B01D 47/10 |

\* cited by examiner

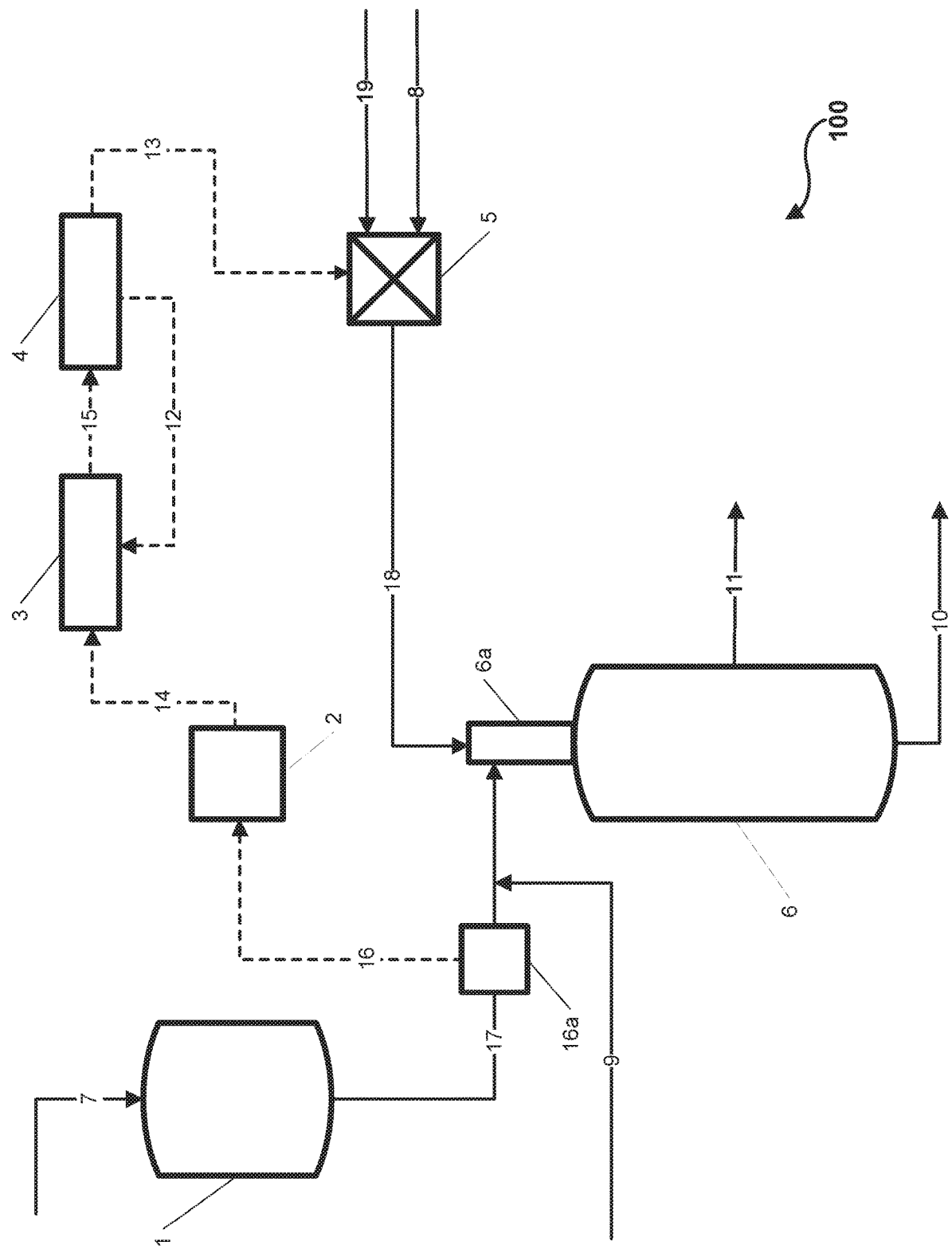

METHOD OF ONLINE CONTROL OF A SLAG FORMING GASIFICATION PROCESS AND PLANT FOR A GASIFICATION PROCESS

CROSS REFERENCE TO RELATED APPLICATION

This application claims the benefit of priority under 35 U.S.C. § 119 (a) and (b) to European patent application No. EP 19020288.7, filed Apr. 15, 2019, the entire contents of which are incorporated herein by reference.

FIELD OF THE INVENTION

The invention relates to a method of online control of a slag-forming process of gasification of a carbonaceous solid fuel, especially coal, in a gasification reactor with supply of a gasifying agent and a moderator. The invention further relates to a gasification process for producing a product gas including carbon monoxide and hydrogen from a solid fuel, to a computer program for online control of the slag-forming gasification process, and to a plant for conducting a gasification process for producing a product gas including carbon monoxide and hydrogen from a solid fuel.

BACKGROUND OF THE INVENTION

Slag-forming gasification processes for production of product gases containing carbon monoxide (CO) and hydrogen ($H_2$) are known from the prior art. For example, carbon from coal is converted to synthesis gas, a mixture of CO and $H_2$, in coal gasification under elevated pressure and at high temperatures. In general, in the gasification of coal, a distinction is made between fixed-bed, fluidized-bed and entrained-flow gasification. According to the deposit, coal has a greater or lesser proportion of inorganic minerals. The minerals obtained as ash residue in the gasification are discharged from the gasification reactor as liquid slag in slag-forming gasification methods.

Online solid fuel analyses for determination of the composition of solid fuels, for example coal, have to date been employed in the field of coal burning for power generation. The advantage of an online solid fuel analysis lies in the short delay between sampling of the solid fuel and delivery of the desired analysis result. By comparison with conventional laboratory methods that typically take several hours of analysis time, online solid fuel analyses enable incorporation in real-time into the process control system of the plant in question, for example a coal power plant.

Gasification processes, for example the gasification of coal, are typically conducted at elevated pressure (up to 68 bar) and high temperatures (900 to 1800° C.). Owing to these extreme conditions, and as a result of the presence of corrosive slag melts, direct measurements of important process parameters are not directly possible. Examples of such process parameters are the slag flow (mass flow rate) and the temperature in the gasification reactor. As a result, it is necessary to utilize indirect measurement parameters for the control of gasification processes. For example, the process temperature can be estimated via the input of heat into the reactor cooling system, the temperature measurement in the reactor wall, or the content of methane ($CH_4$) or carbon dioxide ($CO_2$) in the product gas (see, for example, Gräbner, M.: "Industrial Coal Gasification Technologies Covering Baseline and High-Ash Coal", Wiley-VCH, ISBN 978-3-527-33690-6, 2014). One disadvantage of such measurement and control methods is that the measurement is indirect. Another is that the methods mentioned are feedback methods. These work on the basis of measurements that are only made after the actual gasification reaction in the reactor, without taking account of the composition of the solid fuel prior to entry into the reactor in any way. Owing to the indirect measurement, the control system can thus intervene in the process only when the crucial step in the process, the gasification of the solid fuel, has already occurred.

Rapid variations in the solid fuel quality, especially in the ash content and the ash composition, cannot be detected in a laboratory owing to the long intervals between the individual solid fuel analyses. Moreover, on account of indirect measurements of process parameters, it is frequently not possible to draw any clear conclusions for the plant operation. Since these indirect measurements also frequently work by the feedback principle, these react to changes in the gasification process only with large time delays. As a result, on the basis of the results thus achieved, it is frequently impossible to draw any clear conclusions for the plant operation.

Thus, most solid fuel gasifiers are not operated optimally. A solid fuel analysis frequently conducted just once daily is usually available only after the solid fuel in question has already been gasified. Belated manual interventions into the gasification process on the basis of contradictory trends of indirect measurement parameters and those ascertained by the feedback principle thus cannot establish the ideal operating point of the gasifier. Furthermore, automation of the gasification process on the basis of indirect measurement parameters is barely possible.

A particularly serious problem in gasification methods is that of rapid variations in the solid fuel quality. These are encountered not just in the case of coal but also in the case of other biogenic solid fuels (biomass, sewage sludge) and wastes. Since solid fuels are transported with the aid of conveyor belts into silos or reservoir vessels, segregation by grain size, density, moisture or type (for example in the case of coal mixtures) is unavoidable at all transfer points. As a result, it is possible for significant variations in solid fuel quality to arise within short periods of time, such as a few hours, for the operation of the gasifier. For instance, the inventors, in the operation of plants for slag-forming fly ash gasification of coal, found that the real ash content can vary by several percent by weight (% by weight) from the reference ash content. For example, it was ascertained that, given a measured reference ash content of 13% by weight, the real ash content at the gasification reactor inlet could vary between 11% by weight and 18% by weight. If the reference operating point of the gasification reactor is nevertheless retained because the variation is undetectable, either product gas (for example synthesis gas) is burnt or a poor carbon conversion is achieved, according to whether the real ash content is higher or lower than the reference ash content.

In the case of a higher real ash content compared to the reference ash content, the result is that the temperature in the gasification reactor is too high owing to the exothermic combustion of the product gas. As a result of this, the lifetime of the burner is reduced, the consumption of gasifying agent (for example oxygen) is higher than required in principle (oversupply of oxygen in relation to carbon), product gas production is reduced, and elevated $CO_2$ emissions occur, both from the gasification process itself and as a result of the elevated electrical energy demand in the oxygen production.

In the case of a lower real ash content compared to the reference ash content, the result is that insufficient gasifying agent (for example oxygen) is provided in relation to the higher carbon content of the solid fuel. As a result of this, the temperature in the gasification reactor falls significantly as a result of the carbon excess, which can lead to solidification of the slag and hence to an emergency shutdown of the plant. A further result of this is that some of the carbon is not converted to product gas, which leads to undesirably high amounts of carbon in the ash/slag and in the quench water, which has to be removed therefrom and disposed of in a costly and inconvenient manner. A further result of this is a distinct drop in the amount of product gas per unit carbon supplied, which correspondingly leads to productivity losses.

The instantaneous variations in the solid fuel quality additionally have the result that the significant operational fluctuations that result therefrom also affect the abovementioned indirect measurement parameters. For instance, the indirect measurement parameters are affected by varying removal of heat to the reactor cooling system and steam production therein owing to temperature variations and an altered slag outflow, by variations in the amount and composition of the product gas, and by variations in the composition of the slag. Owing to these problems, it is regularly necessary to intervene manually into the operation of the gasification plant.

Economic boundary conditions frequently also entail frequent changing of the solid fuel in gasification plants, use of inferior fuels with high ash content and hence also slag content, and the need to add fluxes to improve the rheological properties of the slag and to use fuel mixtures (for example coal blends). As a result, the variations in fuel quality that exist in any case are aggravated by further inhomogeneities in the solid fuel.

In summary, it can be stated that it is not directly possible to establish the optimal operating point of a gasification reactor on the basis of available technology owing to variations in the quality of the solid fuel, especially owing to variations in the ash content and the ash composition. Deviations from the optimal operating point of the gasification reactor will lead to elevated energy consumption of the plant, reduced product gas yield, elevated wear and elevated $CO_2$ emissions, to name just a few disadvantages.

SUMMARY OF THE INVENTION

It is thus an object of certain embodiments of the present invention to at least partly overcome the disadvantages of the prior art.

It is a further object of certain embodiments of the present invention to provide a method that enables the ascertaining of the optimal operating point of the gasification reactor at any time, even in the event of rapid variations in the quality of the solid fuel.

It is a further object of certain embodiments of the present invention to provide a method capable of ascertaining an optimized balance of mass, elements and energy in a gasification reactor, even in the event of rapid variations in the quality of the solid fuel.

It is a further object of certain embodiments of the present invention to provide a method that ascertains the operating point, especially the optimized operating point, of a gasification reactor at least partly by the feed-forward principle, by which data required for the establishment of the optimized operating point are ascertained, evaluated and used for control of the method prior to entry of the solid fuel into the gasification reactor.

It is a further object of certain embodiments of the present invention to provide a method of online control of a slag-forming process of gasification of a carbonaceous solid fuel that at least partly achieves the aforementioned objects.

It is a further object of certain embodiments of the present invention to provide a gasification process for production of a product gas including carbon monoxide and hydrogen that at least partly achieves the aforementioned objects.

It is a further object of certain embodiments of the present invention to provide a computer program that can be loaded into the memory of a computer and executed for at least partial control of a method that at least partly achieves the aforementioned objects.

It is a further object of certain embodiments of the present invention to provide a plant for conducting a gasification process for production of a product gas including carbon monoxide and hydrogen from a solid fuel that at least partly achieves the aforementioned objects.

The aforementioned objects are at least partly achieved by a method of online control of a slag-forming process of gasification of a carbonaceous solid fuel, especially coal, in a gasification reactor with supply of a gasifying agent and a moderator, comprising the steps of a) defining the quantity of a product gas to be produced by the gasification process, especially of a synthesis gas;

b) conducting an online solid fuel analysis on a solid fuel sample taken prior to entry of the solid fuel into the gasification reactor by means of an online solid fuel analyser to determine the ash content and the ash composition of the solid fuel prior to entry into the gasification reactor;

c) reading out operating data of the gasification reactor by means of a process control system;

d) processing the data from the online solid fuel analysis and the operating data of the gasification reactor in a process model to ascertain an operating point of the gasification reactor while simultaneously achieving the product gas quantity defined, wherein the process model i. determines the operating temperature of the gasification reactor based on the ash composition ascertained by the online solid fuel analysis in order to enable essentially complete outflow of slag out of the gasification reactor;

ii. determines the required mass flow rate of solid fuel based on the ash content ascertained by the online solid fuel analysis; and iii. determines the required mass flow rate of gasifying agent and moderator based on operating data of the gasification reactor;

e) adjusting the operating point of the gasification reactor by means of the process control system for control of the gasification process.

The process steps specified need not necessarily be executed in the sequence specified.

BRIEF DESCRIPTION OF THE DRAWINGS

The invention is elucidated in detail hereinafter by an example without restricting the subject-matter of the invention. Further features, advantages and possible applications of the invention will be apparent from the following description of the working example in conjunction with the drawing.

The FIGURE shows a schematic flow diagram of the method 100 according to the invention or of the plant 100 according to the invention.

DETAILED DESCRIPTION OF THE INVENTION

Certain embodiments of the invention combine an online solid fuel analysis for solid fuels, for example coal, with a process model in order to operate the slag-forming gasification process at the thermodynamically optimal operating point by the feed-forward principle. The process permits the establishment of the optimal operating point in real-time by reacting to hitherto undetected or undetectable rapid variations in the composition of the solid fuel. The process permits the fully automated operation of a solid fuel gasification process without the need for manual intervention into the gasification process.

The method according to certain embodiments of the invention, by contrast with control methods known to date, works by the feed-forward principle. According to this principle, the composition and the ash content of the solid fuel are ascertained with the aid of the online solid fuel analyser before the solid fuel represented by the analysis enters the gasification reactor. At the same time, the operating data generated by the gasification reactor are read out by the process control system of the plant and processed together with the analysis data of the online solid fuel analyser in a process model. The process model calculates the optimal operating point for the operation of the gasification reactor before the solid fuel represented by the online solid fuel analysis enters the gasification reactor. If the ash content, for example, is higher than the reference ash content, less carbon is available in relative terms and the process model calculates, inter alia, that the amount of solid fuel, for example coal, is correspondingly increased in order not to unintentionally burn portions of the product gas. If the ash content, for example, is lower than the reference ash content, more carbon is available in relative terms and the process model calculates, inter alia, that the amount of solid fuel, for example coal, is reduced in order to increase the carbon yield.

The operating point is understood to mean a set of parameters that enable optimal operation, i.e. optimal operating conditions and an optimal operating state, in order to operate the gasification reactor under thermodynamically optimal conditions. The operating point of the gasification reactor changes continuously during operation depending at least on the ash content and the ash composition of the solid fuel used. The operating point cannot be defined beforehand and is redetermined continuously, i.e. online, by the process model. The operating point comprises, but is not limited to, a temperature or a temperature interval sufficiently low that a maximum carbon conversion is achieved on the one hand and undisrupted run-off of the slag is assured at the same time. In one example, the carbon conversion is at least 90%, preferably at least 95%, and further preferably at least 98%. Depending on the operating temperature, the viscosity of the slag in one example is less than 25 Pa*s at the respectively prevailing operating temperature in the gasification reactor.

For the purposes of the present invention, the process model ascertains the balance of energy, mass and elements in the gasification process in order to calculate the (optimal) operating point of the gasification process. The energy balance of the gasification process depends on the prevailing thermodynamic equilibria and the kinetics of the gasification process. The energy balance can be used to ascertain the operating temperature that assures slag outflow out of the reactor.

The gasification reactor in the context of the invention includes not just the reactor as such, i.e. the solids gasifier in which the actual conversion of solid-state material to product gas takes place. The gasification reactor also includes, but is not limited to, the periphery connected to the solids gasifier and required for the gasification process, for example a burner, conduits leading solid fuel in and out, conveying gas, gasifying agent and moderator.

The (optimal) operating point ascertained by the process model is transmitted to the process control system of the plant, which adjusts the operating point and hence controls the gasification process.

A gasifying agent is understood, without limitation, to mean a gas or gas mixture that reacts exothermically with the solid fuel, i.e. has a negative enthalpy of reaction on reaction with the solid fuel. Examples of typical gasifying agents are air, oxygen and hydrogen.

A moderator is understood, without limitation, to mean a gas or gas mixture that reacts endothermically with the solid fuel, i.e. has a positive enthalpy of reaction on reaction with the solid fuel. Additionally or alternatively, the moderator does not react with the solid fuel but is inert and removes heat from the process owing to its heat capacity. Additionally or alternatively, the moderator is a liquid, and heat is removed from the process owing to the enthalpy of evaporation of the moderator. Examples of moderators are steam, $CO_2$, water and nitrogen.

The expression "online" in the context of the invention means, without limitation, that the step in question is executed during operation, especially continuously during operation, or the machine in question works during operation, especially continuously during operation, for example conducts analyses.

A preferred embodiment of the method according to the invention is characterized in that steps b) to e) are repeated continuously in order to continuously ensure an optimized mode of operation of the gasification reactor or continuously adjust the mode of operation of the gasification reactor depending on variations in the ash content and in the ash composition of the solid fuel over time.

It is advantageous here to repeat steps b) to e) as often as possible, so that the process model can take account even of rapid variations in the solid fuel composition and the operating point can correspondingly be readjusted each time in order as far as possible not to vary from the optimal mode of operation of the gasification reactor at any time.

A further-preferred embodiment of the method according to the invention is therefore characterized in that steps b) to e) are repeated at an interval of 10 seconds to 300 minutes, preferably repeated at an interval of 1 minute to 60 minutes, more preferably repeated at an interval of 3 minutes to 30 minutes, further preferably repeated at an interval of 5 minutes to 10 minutes.

A preferred embodiment of the method according to the invention is characterized in that the operating temperature of the gasification reactor is calculated on the basis of a thermodynamic model for determination of the ash liquidus temperature as a function of the ash composition, wherein the calculated ash liquidus temperature corresponds to the operating temperature of the gasification reactor.

The operating temperature to be established is a minimum temperature below which the temperature should not go if at all possible, which is intended to ensure reliable outflow of slag—essentially liquefied ash—out of the gasification reactor. This temperature depends on the composition of the ash. The composition of the ash is ascertained by the online solid fuel analyser. It is thus possible on the basis of the data ascertained by the online solid fuel analyser to calculate what is called the liquidus temperature of the ash, or ash liquidus temperature, on the basis of a thermodynamic model. The calculation is effected by the process model. The ash liquidus temperature is that temperature above which no crystals are present any longer in the melt of the slag.

A preferred embodiment of the method according to the invention is characterized in that the operating temperature of the gasification reactor is calculated on the basis of an artificial neural network model for determination of the ash fluid temperature as a function of the ash composition, where the operating temperature is above the calculated ash fluid temperature, preferably 50 to 100 K above the calculated ash fluid temperature.

As an alternative to the determination of the operating pressure on the basis of the ash liquidus temperature, it is also possible to ascertain the operating temperature on the basis of what is called the ash fluid temperature. The ash fluid temperature is calculated here from the ash composition with the aid of an artificial neural network model. The operating temperature here is above the calculated ash fluid temperature. Preference is given to choosing an operating temperature 50 to 100 K above the calculated ash fluid temperature. The term "ash fluid temperature" is defined in ASTM Standard D1857M-04(2010).

A preferred embodiment of the process according to the invention is characterized in that the online solid fuel analysis in step b) is conducted with the aid of a method selected from the group comprising
prompt gamma neutron activation analysis (PGNAA), laser induced breakdown spectroscopy (LIBS) and x-ray fluorescence analysis (XRF).

Which of the methods mentioned is used depends on the nature of the solid fuel, the typical ash content and the typical ash composition.

The PGNAA method has the advantage that it is thus possible to analyse virtually all chemical elements that occur in the solid fuel. It is thus possible by the PGNAA method to analyse not just the elements that form inorganic compounds (metals, semimetals) in the ash, but also elements that form organic compounds and are present in the solid fuel, such as carbon, nitrogen and oxygen. This enables complete online analysis of the solid fuel with the aid of the PGNAA method. Owing to its requirement for a rapidly decaying radiation source, however, the installation of a PGNAA analyser is associated with relatively high demands for approval, maintenance and integration into the existing plant.

The LIBS method can detect the most important chemical elements in the solid fuel, but requires a smooth, representative, fine-grain and fly dust-free surface of the analyte, which can impair the reliability of the test method in operation.

The XRF method is robust, inexpensive and requires solid fuels in dust form with grain sizes of particle size less than 200 μm for analysis. It allows the reliable detection of chemical elements having an atomic number $Z>10$. It is thus possible to reliably detect the elements that form inorganic compounds in the ash of the fuel in order to determine the ash composition and the ash content. Owing to its robustness and favourable costs, the XRF method is preferably used for the online fuel analysis in step b).

Examples of elements that form inorganic compounds and define the ash composition and the ash content of the solid fuel are Al, Si, Fe, Ca, S, P, Cl, K, Ti, Cr and Mn. In order to perform the method according to the invention, it is sufficient to determine the content of the main elements in the ash, while there is no need to analyse elements that occur in traces. Chemical elements that occur in traces affect the ash content and hence the (optimal) operating point of the gasification process to such a low degree that they are negligible.

A preferred embodiment of the method according to the invention is characterized in that the ash content and the ash composition are determined on the basis of typical oxidation ratios of the analysed elements that form inorganic compounds.

The ash of a solid fuel in any case includes chemical elements that are in fully oxidized form irrespective of the conditions in the gasification process. Examples of such elements are silicon (as $SiO_2$), calcium (as $CaO$) and aluminium (as $Al_2O_3$). Other elements, depending on the character of the atmosphere in the gasification process (oxidizing or reducing atmosphere) are present in non-oxidized form or in different degrees of oxidation. One example of such an element is iron, which may be present in the ash in the form of elemental iron (Fe), FeO, $Fe_3O_4$, and $Fe_2O_3$ or in a mixture with or composed of the aforementioned elements. Depending on the respective proportions, this leads to different ash fluid temperatures or ash liquidus temperatures. It is therefore necessary to determine the exact oxidation conditions prior to the employment of the method according to the invention in an ash melt test under oxidizing or reducing atmosphere. The atmosphere adopted here is that which is present primarily under the conditions of the gasification process. Once the "typical oxidation ratios" have been ascertained, the element composition ascertained by the online solid fuel analyser can be converted to an ash composition and normalized.

A preferred embodiment of the method according to the invention is characterized in that the method comprises the determination of the organic content and the organic composition of the solid fuel and the determination of the water content of the solid fuel prior to entry into the gasification reactor, and the ash content, the ash composition, the organic content, the organic composition and the water content of the solid fuel are used in the process model to ascertain the overall composition of the solid fuel.

The ascertaining of the overall composition of the solid fuel enables a further increase in precision of the data processed in the process model, such that the determination of the overall composition of the solid fuel permits the determination of a further-optimized operating point. The determination of the organic content and the organic composition of the solid fuel, i.e. the determination of the chemical elements C, H, N and S and the determination of the water content of the solid fuel, if this cannot be provided by the online solid fuel analyser, is effected prior to the method, for example on the basis of an elemental analysis conducted by the supplier of the solid fuel.

It is preferable here that the overall composition of the solid fuel is used to ascertain the net calorific value and/or the gross calorific value of the solid fuel.

The determination of the net calorific value and/or gross calorific value of the solid fuel from the overall composition permits a further increase in the precision of the data processed in the process model, such that the determination of the net calorific value and/or gross calorific value of the solid fuel on the basis of its overall composition permits the determination of a further-optimized operating point since the precision of the thermodynamic enthalpy of formation for carbon (graphite) is increased by the gross calorific value. The determination of the net calorific value and/or gross calorific value especially permits exact calculation of the energy balance of the gasification process. The net calorific value of the solid fuel is generally understood to mean the amount of heat released on combustion with subsequent cooling to 25° C. at standard pressure, the water vapour generated in the combustion reaction being in gaseous form. The gross calorific value of the solid fuel is understood to mean the net calorific value plus the amount of heat released by complete condensation of water vapour on cooling to 25° C. (enthalpy of condensation). The determination of the net and/or gross calorific value can be ascertained on the basis of the overall composition of the solid fuel, for example with the aid of known approximation formulae (Ref. Gräbner, see above).

A preferred embodiment of the method according to the invention is characterized in that the organic content and the organic composition and/or the water content of the solid fuel are determined by means of the online solid fuel analyser in step b).

Ideally, the organic content and the organic composition and/or the water content of the solid fuel are likewise determined continuously and together with the determination of the ash content and the ash composition by the online solid fuel analyser. In this way, it is possible to constantly take account even of variations in the composition of the organic content and of the water content in the determination of the operating point by means of the process model, which means a further increase in precision of the data processed by the process model and hence a further-optimized determination of the operating point.

A preferred embodiment of the method according to the invention is characterized in that the method comprises the determination of the bulk density of the solid fuel prior to entry into the gasification reactor.

The determination of the bulk density of the solid fuel prior to entry into the gasification reactor enables a further increase in precision of the data processed in the process model, such that the determination of the bulk density of the solid fuel permits the determination of a further-optimized operating point. The bulk density here is not determined by means of the online solid fuel analyser, but prior to or during the method at selected time intervals. The determination of the bulk density especially enables a further increase in precision of the determination of the mass flow rate of solid fuel required at the (optimized) operating point.

A preferred embodiment of the method according to the invention is characterized in that the method comprises the determination of the time interval between the taking of the solid fuel sample and the entry of the solid fuel represented by the solid fuel analysis into the gasification reactor in order to adjust the operating point ascertained in step d) at the time of entry of the solid fuel represented by the solid fuel analysis into the gasification reactor by means of the process control system in step e).

There is a time delay between sampling of the solid fuel by the online solid fuel analyser and the entry of the actual solid fuel represented by this sampling. The size of this time delay depends on whether the online solid fuel analyser is disposed close to the entrance to the gasification reactor or further away from the entrance to the gasification reactor or there are vessels in between (e.g. locks, reservoir vessels). However, the operating point ascertained by the process model on the basis of the online analysis should ideally be transmitted from the process control system to the gasification reactor for control of the gasification method only when the solid fuel represented by the online fuel analysis is actually entering the gasification reactor. The aforementioned time delay should therefore preferably be ascertained and taken into account in the implementation of the method.

A preferred embodiment of the method according to the invention is characterized in that the solid fuel is selected from an element from the group comprising coal, biomass, sewage sludge, refuse derived fuel and mineral-contaminated plastics.

The method according to the invention is applicable in principle to any carbon-based solid fuel which is not fully converted in the gasification to a product gas such as synthesis gas but contains mineral constituents that remain as ash residue in the gasification. It is immaterial here whether the solid fuel is a biogenic or non-biogenic solid fuel.

A preferred embodiment of the method according to the invention is characterized in that the solid fuel sample is provided in particulate form, preferably in dust form, for performance of the online solid fuel analysis.

The provision of the solid fuel sample in particulate form permits the direct determination of the data required by the online solid fuel analyser. If the solid fuel is not already in particulate form, for example in the case of entrained flow gasification of coal, the solid fuel may be prepared for the sampling in a suitable manner, for example by means of a mill and/or drying.

A prerequisite for the working of the method according to the invention is the fixing of the amount of the product gas to be produced by the gasification process. The ascertaining of the mass, element and energy balance of the gasification process by the process model is possible only when the amount of product gas to be produced has been defined.

The product gas in the gasification process may be any gas obtainable by the gasification of a carbonaceous solid fuel. Examples of product gases are synthesis gas, water gas or cracking gas. Preferably, the product gas includes at least $H_2$ and CO as components in the product gas mixture and is suitable, for example, for the production of methanol.

In order to ascertain the (optimal) operating point of the gasification reactor by means of the process model, one requirement is the readout of the operating data of the gasification reactor via a process control system. This means that, in order to ascertain the optimal operation of the gasification reactor, there must be various known states of operation or boundary conditions that are selected according to the configuration of the respective process type.

These boundary conditions include, in a non-exhaustive or non-limiting enumeration, the composition, pressure and temperature of the conveying gas required for the conveying of the solid fuel. Examples of conveying gases are $N_2$ and $CO_2$. In the case of what is called slurry introduction, no conveying gas is required. These boundary conditions also include the loading of the conveying gas with solid fuel and the solid fuel mass flow rate. These boundary conditions also include the composition, pressure, temperature and amount of purge gases. These boundary conditions also include the purity, pressure and temperature of the gasifying agent, for example of oxygen. These boundary conditions also include the pressure, temperature and amount of the moderator, for example of steam. These boundary conditions also include the current amount, temperature and pressure of the steam generated in the reactor cooling system, and pressure and temperature of the boiler feed water. These boundary conditions also include the respective current fill level of one, more than one or all vessels between the online solid fuel analysis and entry of the solid fuel into the gasifier, and the mass flow rate of the solid fuel.

The process model ascertains, on the basis of the data from the online solid fuel analysis and the operating data of the gasification reactor, the (optimal) operating point of the gasification reactor, the operating point being ascertained in such a way that the fixed amount of product gas, i.e. that to be produced, is attained simultaneously. The ascertaining of the operating point requires at least the determination of the operating temperature of the gasification reactor, the required mass flow rate of solid fuel and the required mass flow rate of gasifying agent and moderator as per steps d) i. to iii.

Depending on the boundary conditions of the respective gasification process, the following aspects may be material in the ascertaining of the (optimal) operating point, the enumeration that follows being non-exhaustive or non-limiting. In one aspect, the process model collates the data of the fully ascertained solid fuel composition, of the purge gases, of the fuel mass flow rate, of the conveying gases and of the gasifying agent and the moderator in a balance model, taking account of the physical parameters respectively ascertained. In a further aspect, the current amount of moderator can be kept constant while the amount of gasifying agent is increased until a target carbon conversion of at least 95%, preferably at least 98%, more preferably at least 99% and further preferably at least 99.9% is attained. In a further aspect, the amount of moderator, for example of steam, is increased when the process temperature ascertained is higher than the operating temperature ascertained on the basis of the ash composition. In a further aspect, the amount of moderator, for example of steam, is reduced when the process temperature ascertained is lower than the operating temperature ascertained on the basis of the ash composition. In a further aspect, proceeding from the amounts of gasifying agent and moderator at operating temperature, the variance of an amount of product gas predicted therefrom from the fixed amount of product gas is ascertained. On the basis of the variance ascertained, the amounts of solid fuel (fuel supply), gasifying agent, moderator and conveying gas are adjusted in order to attain the fixed amount of product gas. In a further aspect, on the basis of the fill levels of the vessels and the bulk density of the fuel, preferably the bulk density of the dry and ground fuel, the juncture when the fuel represented by the online solid fuel analysis is actually introduced into the gasification reactor is ascertained. From this juncture, the operating point ascertained beforehand is applicable. The operating point thus ascertained is applicable until performance of the next online solid fuel analysis.

The operating point ascertained by the process model is established by the process control system in order to control the gasification reactor on the basis of the parameters defined at the operating point. This includes the following control parameters for control of the gasification process and/or gasification reactor, the enumeration that follows being neither exhaustive nor limiting.

In one aspect, the amount of solid fuel supplied, for example the fuel mass flow rate, is included as a control parameter. In a further aspect, the amount of gasifying agent, for example expressed as the ratio of oxygen to coal, is included as a control parameter. In a further aspect, the amount of moderator, for example expressed as the ratio of $H_2O$ to oxygen, is included as a control parameter.

The method according to the invention thus enables, for the first time, reaction to rapid variations in the solid fuel quality and running of the efficiency of product gas production continuously at the thermodynamic maximum. The gasification process may also be fully automated.

The objects of the invention are also at least partly achieved by a gasification process for production of a product gas including carbon monoxide and hydrogen from a solid fuel under elevated pressure and at elevated temperature, comprising a method according to the invention for online control of a gasification process.

The objects of the invention are also achieved at least partly by a computer program that can be loaded into the memory of a computer for performance of step d) in the performance of the method according to the invention for online control of a gasification process.

The computer program according to the invention is thus capable of processing the data from the online solid fuel analysis and the operating data of the gasification reactor, and of implementing them in a process model for ascertaining the operating point of the gasification reactor.

The objects of the invention are also achieved at least partly by a plant for performing a gasification process for production of a product gas including carbon monoxide and hydrogen from a solid fuel under elevated pressure and elevated temperature, having a solid fuel reservoir vessel; conveying means for transporting the solid fuel from the solid fuel reservoir vessel into a gasification reactor; conveying means for supplying gasifying agent and moderator to the gasification reactor; conveying means for removing the product gas generated from the gasification reactor; a sampling point disposed between the solid fuel reservoir vessel and the gasification reactor for taking solid fuel samples and then conducting an online solid fuel analysis in an online solid fuel analyser coupled to the sampling point; a process control system coupled to the gasification reactor; and a data processing device, coupled to the online solid fuel analyser and the process control system, for processing the analysis data ascertained in the online solid fuel analyser and for processing the operating data of the gasification reactor transmitted to the data processing device by the process control system, wherein the analysis data from the solid fuel analyser and the operating data of the gasification reactor can be used to ascertain an operating point of the gasification reactor by means of a process model in the data processing device, and the gasification process can be controlled by means of the operating point transmitted to the process control system by the data processing device.

In one example, the gasification process is a slag-forming gasification process. In this case, the plant has conveying means for drawing the slag off from the gasification reactor. In one example, the conveying means is a slag takeoff.

Now turning to The FIGURE, by conveying means 7, for example a conveyor belt, dried hard coal (not shown) taken from a silo (not shown) is conveyed into a solid fuel reservoir vessel 1. The coal is in dust form (particle size<100 µm) with a residual moisture content of 2% by weight. The coal is transported via the solid fuel conduit 17 with addition of conveying gas (carbon dioxide) supplied from conveying gas conduit 9 into the burner space of the burner 6a and converted to synthesis gas in the solids gasifier 6.

The solids gasifier 6, the burner 6a and the periphery connected to these components, for example the supply conduits 17 and 18 and an outgoing product gas conduit 11 and a slag takeoff 10, together form the gasification reactor.

The aim of the gasification process is the production of an amount of 50 000 (fifty thousand) m$^3$ (STP) of synthesis gas per hour, the amount reported being based on the amount of hydrogen and carbon monoxide generated. Synthesis gas is drawn off from the solids gasifier 6 via product gas conduit 11.

The water- and ash-free composition of the hard coal is known from laboratory analyses (C: 86.77; H: 3.38; O: 8.32; N: 1.07; S: 0.46, each in % by weight) and varies only slightly within a batch of hard coal.

At the sampling point 16a, by means of a solid fuel withdrawal system, a solid fuel sample 16 is taken from conduit 17 at intervals of 5 minutes and analysed by means of x-ray fluorescence analysis (XRF) in the solid fuel analyser 2. The solid fuel analysis data 14 ascertained include the frequently highly variable mineral content and the composition of the minerals in the hard coal which are converted to the fully oxidized state and hence processed further as ash content and ash composition. In the example, the hard coal has an ash content of 11.75% by weight, where this content has the following composition (figures reported are the main components each in % by weight, no figures for trace elements): 55.87 $SiO_2$; 21.53 $Al_2O_3$; 11.21 $Fe_2O_3$; 2.68 CaO; 1.17 $TiO_2$; 2.16 $SO_3$; 0.32 $P_2O_5$; 2.29 $K_2O$ and 0.15 MnO.

The solid fuel analysis data 14 are transmitted to a process model 3 that calculates a mass, energy and element balance of the gasification process. In order to model the gasification reactor and the ash behaviour, a thermodynamic equilibrium model as described in Gräbner, M.: "Industrial Coal Gasification Technologies Covering Baseline and High-Ash Coal", Wiley-VCH, ISBN 978-3-527-33690-6, 2014 on pages 131 ff is used.

For the calculation, apart from the solid fuel analysis data 14, further operating data 12 of the gasification process are required, which are transmitted to the process control system (not shown), read out from the process control system 4 and transmitted to the process model 3. The operating data 12 include current values for the state of gasifying agent from gasifying agent conduit 19 (oxygen with 99.6 purity at 180° C. and 42.5 bar),
the state of the moderator from moderator conduit 8 (steam at 400° C. and 48 bar),
the type, possible loading and state of the solid fuel conveying gas from conveying gas conduit 9 (carbon dioxide, 390 kg of hard coal dust per effective m³ of $CO_2$, at 80° C. and 43 bar),
the state of the solid fuel 7 supplied to the solids gasifier 6 via solid fuel conduit 17 (80° C., 43 bar),
the process pressure (40 bar),
the amount of steam and the state of steam that are generated by the cooling of the reactor wall of the solids gasifier 6 (steam: 3000 kg/h at 46 bar and 260° C., replaced by boiler feed water at 48 bar and 170° C.), and
the fill levels of all vessels between sampling point 16a and solids gasifier 6 (not shown).

The process model 3 first calculates the liquidus temperature (1430° C.) from the ash composition. This is defined as the minimum reactor temperature for the gasification reactor in order to assure reliable run-off of the slag from solids gasifier 6 via slag takeoff 10. In addition, a corresponding carbon conversion (97%) is calculated for this temperature with the aid of an empirical equation. Subsequently, the process model iteratively varies the oxygen volume flow rate in such a way that the reactor temperature of 1430° C. is attained (14 840 m³ (STP)/h),
the moderator mass flow rate (steam) in such a way that the carbon conversion of 97% is attained (770 kg/h), and
the hard coal mass flow rate in such a way that the synthesis gas rate of 50 000 m³/h of hydrogen and carbon monoxide is attained (27 175 kg/h).

The settings thus ascertained represent the minimum consumption of oxygen, coal and steam required to generate synthesis gas including 50 000 m³ (STP)/h of hydrogen and carbon monoxide. Thus, the settings are also referred to as optimal operating conditions 15 or operating point.

According to the length of the solid fuel conduit 17, the coal mass flow rate and the fill levels of all vessels (not shown) between sampling point 16a and solids gasifier 6, the process model 3 calculates the dead time between fuel sampling and the actual entry of the hard coal into the solids gasifier 6 (23 minutes). This is used to calculate the juncture from which the setting of the optimal operating conditions 15 (of the operating point) is transmitted to the process control system 4 for establishment of the amounts and conditions for gasifying agent in gasifying agent conduit 19 and moderator in moderator conduit 8. The setting is made with the aid of the control 13 of the process control system 4, based on the optimal operating conditions 15 transmitted from the process model 3 to the process control system 4. The carbon mass flow rate is established automatically via the fixing of the oxygen to coal mass flow ratio ($O_2$/coal=0.78 kg/kg) by means of the process control system 4.

Moderator and gasifying agent are mixed in the mixing point 15 and transported via conduit 18 as a mixture to the burner 6a of the solids gasifier 6. In the burner 6a and solids gasifier 6, coal conveyed with carbon dioxide from conveying gas conduit 9 from solid fuel conduit 17 is reacted with gasifying agent and moderator from conduit 18 to give synthesis gas.

In accordance with the frequency of the solids sampling of 5 minutes, the optimal operating conditions 15 are transmitted again to the process control system 4 at the same interval, taking account of the dead time. It is thus possible to ensure efficient operation of the gasification reactor even in the event of high variations in the ash contents and the ash composition of the hard coal.

Embodiments of the invention are described with reference to different types of subject-matter. In particular, certain embodiments are described with reference to method claims while other embodiments are described with reference to apparatus claims. However, a person skilled in the art will infer from the description above and that which follows that, unless stated otherwise, in addition to any combination of features that belong to one type of claim, any combination between features in relation to different types of subject-matter or types of claim may also be considered. All features may be combined to achieve synergistic effects which go beyond simple summation of the technical features.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing (i.e., anything else may be additionally included and remain within the scope of "comprising"). "Comprising" as used herein may be replaced by the more limited transitional terms "consisting essentially of" and "consisting of" unless otherwise indicated herein.

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

LIST OF REFERENCE NUMERALS

1 Solid fuel reservoir vessel
2 Solid fuel analyser
3 Process model
4 Process control system
5 Mixing point
6 Solids gasifier
6a Burner
7 Conveying means
8 Moderator conduit
9 Conveying gas conduit
10 Slag takeoff
11 Product gas conduit
12 Operating data
13 Control
14 Solid fuel analysis data
15 Optimal operating conditions
16 Solid fuel sample
16a Sampling point
17 Solid fuel conduit
18 Conduit
19 Gasifying agent conduit
100 Method or plant

The invention claimed is:

1. A method of online control of a slag-forming process of gasification of a carbonaceous solid fuel, in a gasification reactor with supply of a gasifying agent and a moderator, the method comprising the steps of:
   a) defining the quantity of a product gas to be produced by the gasification process;
   b) conducting an online solid fuel analysis on a solid fuel sample taken prior to entry of the solid fuel into the gasification reactor by means of an online solid fuel analyzer to determine an ash content and an ash composition of the solid fuel prior to entry into the gasification reactor;
   c) reading out operating data of the gasification reactor by means of a process control system;
   d) processing the data from the online solid fuel analysis and the operating data of the gasification reactor in a process model to ascertain an operating point of the gasification reactor while simultaneously achieving a product gas quantity defined, wherein the process model:
      i. determines an operating temperature of the gasification reactor based on the ash composition ascertained by the online solid fuel analysis in order to enable essentially complete outflow of slag out of the gasification reactor, wherein the operating temperature corresponds to a calculated ash liquidus temperature;
      ii. determines a required mass flow rate of solid fuel based on the ash content ascertained by the online solid fuel analysis; and
      iii. determines a required mass flow rate of gasifying agent and moderator based on operating data of the gasification reactor; and
   e) adjusting the operating point of the gasification reactor by means of the process control system for control of the gasification process.

2. The method according to claim 1, wherein steps b) to e) are repeated continuously in order to continuously adjust the operating point of the gasification reactor depending on variations in the ash content and in the ash composition of the solid fuel over time.

3. The method according to claim 2, wherein steps b) to e) are repeated at an interval of 10 seconds to 300 minutes.

4. The method according to claim 2, wherein steps b) to e) are repeated at an interval of 1 minute to 60 minutes.

5. The method according to claim 2, wherein steps b) to e) are repeated at an interval of 5 minutes to 10 minutes.

6. The method according to claim 1, wherein the operating temperature of the gasification reactor is calculated on the basis of a thermodynamic model for determination of the ash liquidus temperature as a function of the ash composition.

7. The method according to claim 1, wherein the operating temperature of the gasification reactor is calculated on the basis of an artificial neural network model for determination of the ash fluid temperature as a function of the ash composition, wherein the operating temperature is above the calculated ash fluid temperature.

8. The method according to claim 7, wherein the operating temperature is 50 to 100 K above the calculated ash fluid temperature.

9. The method according to claim 1, wherein the online solid fuel analysis in step b) is conducted with the aid of a method selected from the group consisting of:
   (a) prompt gamma neutron activation analysis (PGNAA),
   (b) laser induced breakdown spectroscopy (LIBS), and
   (c) x-ray fluorescence analysis (XRF).

10. The method according to claim 1, wherein the ash content and the ash composition are determined on the basis of typical oxidation ratios of the analysed elements that form inorganic compounds.

11. The method according to claim 1, wherein the method comprises the determination of the organic content and the organic composition of the solid fuel and the determination of the water content of the solid fuel prior to entry into the gasification reactor, and the ash content, the ash composition, the organic content, the organic composition and the water content of the solid fuel are used in the process model to ascertain the overall composition of the solid fuel.

12. The method according to claim 11, wherein the overall composition of the solid fuel is used to ascertain the net calorific value and/or the gross calorific value of the solid fuel.

13. The method according to claim 11, wherein the organic content and the organic composition and/or the water content of the solid fuel are determined by means of the online solid fuel analyser in step b).

14. The method according to claim 1, wherein the method comprises the determination of the bulk density of the solid fuel prior to entry into the gasification reactor.

15. The method according to claim 1, wherein the method comprises the determination of the time interval between the taking of the solid fuel sample and the entry of the solid fuel represented by the solid fuel analysis into the gasification reactor in order to adjust the operating point ascertained in step d) at the time of entry of the solid fuel represented by the solid fuel analysis into the gasification reactor by means of the process control system in step e).

16. The method according to claim 1, wherein the solid fuel is selected from an element from the group comprising coal, biomass, sewage sludge, refuse derived fuel and mineral-contaminated plastics.

17. The method according to claim 1, wherein the solid fuel sample for conducting the online solid fuel analysis is provided in particulate form, preferably in dust form.

18. A computer program loaded into the memory of a computer for conducting step d) in the performance of the method according to claim 1.

* * * * *